(12) United States Patent
Wallner et al.

(10) Patent No.: US 9,582,451 B2
(45) Date of Patent: Feb. 28, 2017

(54) RECEIVER ARCHITECTURE

(71) Applicant: Infineon Technologies AG, Neubiberg (DE)

(72) Inventors: Paul Wallner, Prien (DE); Dieter Metzner, Eichenau (DE); Martin Streibl, Petershausen (DE)

(73) Assignee: Infineon Technologies AG, Neubiberg (DE)

( * ) Notice: Subject to any disclaimer, the term of this patent is extended or adjusted under 35 U.S.C. 154(b) by 363 days.

(21) Appl. No.: 13/756,835

(22) Filed: Feb. 1, 2013

(65) Prior Publication Data

US 2014/0223050 A1    Aug. 7, 2014

(51) Int. Cl.

| G06F 13/00 | (2006.01) |
|---|---|
| G01R 31/08 | (2006.01) |
| G06F 11/00 | (2006.01) |
| G08C 15/00 | (2006.01) |
| G06F 13/40 | (2006.01) |
| G06F 13/42 | (2006.01) |

(52) U.S. Cl.
CPC ...... *G06F 13/4063* (2013.01); *G06F 13/4295* (2013.01); *Y02B 60/1228* (2013.01); *Y02B 60/1235* (2013.01)

(58) Field of Classification Search
USPC .......................................... 710/107; 370/252
See application file for complete search history.

(56) References Cited

U.S. PATENT DOCUMENTS

| 3,869,670 A * | 3/1975 | Grutzmann ........... H04L 25/497 |
| | | 375/268 |
| 5,675,590 A * | 10/1997 | Alamouti ............ H03M 13/235 |
| | | 379/38 |
| 5,898,734 A * | 4/1999 | Nakamura et al. ........... 375/287 |
| 5,910,751 A * | 6/1999 | Winn ...................... H03F 1/302 |
| | | 327/512 |
| 6,072,804 A * | 6/2000 | Beyers, Jr. .................... 370/450 |

(Continued)

FOREIGN PATENT DOCUMENTS

| CN | 1191645 A | 8/1998 |
| CN | 1946048 A | 4/2007 |

OTHER PUBLICATIONS

Lorenz, Steffen, "The FlexRay Electrical Physical Layer Evolution," 1 Automotive 2010 Flexray, © Carl Hanser Verlag GmbH & Co.KG, Muenchen, www.hanser-automotive.de; Nicht zur Verfuegung in intranet—u.Internet-Angeboten oder elektron Verteilern, 2010, 6 pages.

(Continued)

*Primary Examiner* — Faisal M Zaman
(74) *Attorney, Agent, or Firm* — Slater Matsil, LLP

(57) ABSTRACT

In accordance with an embodiment, a receiver includes a first state machine configured to be coupled to a bus. The first state machine is configured to determine that a first output signal is a first symbol if a first received bus signal transitions from a first bus state to a second bus state and stays in the second bus state for less than a first predetermined period of time, and the first output signal is a second symbol if the first received bus signal transitions from the first bus state to the second bus state and stays in the second bus state for at least the first predetermined period of time.

29 Claims, 12 Drawing Sheets

(56) References Cited

U.S. PATENT DOCUMENTS

| | | | | |
|---|---|---|---|---|
| 6,456,219 B1* | 9/2002 | Schreiber | .............. | H03M 3/458 |
| | | | | 341/143 |
| 6,697,420 B1* | 2/2004 | Simon et al. | ................. | 375/220 |
| 6,707,403 B1* | 3/2004 | Hurrell | ............... | H03M 1/1061 |
| | | | | 341/120 |
| 6,788,340 B1* | 9/2004 | Chen | ..................... | H04N 5/243 |
| | | | | 348/229.1 |
| 6,937,664 B1* | 8/2005 | Park | ........................ | H04L 25/49 |
| | | | | 375/259 |
| 8,103,943 B2* | 1/2012 | Lablans | ........................ | 714/784 |
| 8,890,082 B2* | 11/2014 | Scott | ........................ | G01T 1/247 |
| | | | | 250/370.09 |
| 2002/0114406 A1* | 8/2002 | Mashimo | ................ | G11B 20/10 |
| | | | | 375/322 |
| 2006/0092147 A1* | 5/2006 | Roberts | ................ | G09G 3/2077 |
| | | | | 345/204 |
| 2010/0141499 A1* | 6/2010 | Mathe | ................... | H03M 1/462 |
| | | | | 341/172 |
| 2011/0254717 A1* | 10/2011 | Van De Vel | ......... | H03M 1/1245 |
| | | | | 341/122 |
| 2015/0035609 A1* | 2/2015 | Adams | ..................... | H03H 7/42 |
| | | | | 330/301 |

OTHER PUBLICATIONS

"FlexRay Communications System Protocol Specification Version 3.0.1," FlexRay™; Oct. 2010, pp. 1-341.

* cited by examiner

RECEIVER ARCHITECTURE

TECHNICAL FIELD

The present invention relates generally to the field of circuits, in particular to receivers.

BACKGROUND

Communications networks that interconnect electronic components in a vehicle may operate under one or more protocols such as the Controller Area Network (CAN), Local Interconnect Network (LIN), and the FlexRay protocol. In automotive systems, in particular the operation of these automotive networks is often subject to safety and reliability requirements to ensure the safety of the automobile and its passengers. For example, robustness against absorbed radiation and suppressing of the generation of radiation may be a part of a conformance test.

The FlexRay protocol utilizes a high data rate up to 10 Mbit/s to connect automotive electronic control units (ECUs), such as electronic control modules (ECM), transmission control modules (TCM), brake control modules (BCM)), Central Control Modules (CCM), Central Timing Modules (CTM), General Electronic Modules (GEM), Body Control Modules (BCM), Suspension Control Modules (SCM), control units, or control modules. Dual wires are used as the medium for communications, and signaling on the bus is accomplished by asserting a differential voltage between those two wires in the FlexRay protocol. The bus may have three states: two data states and an idle state. Also, the FlexRay protocol limits the propagation delay, jitter, EMC requirements, network topologies, and functional transceiver operation modes for the communications network. For example, the network topology may include point-to-point connections via linear passive busses and passive stars up to active star topologies. One component of a communications network is a receiver, which is used to receive and transform a signal, for example a bus signal. For example, a receiver converts the information carried by the signal to a usable form, for example by converting an analog signal to a digital signal.

SUMMARY OF THE INVENTION

In accordance with an embodiment, a receiver includes a first state machine configured to be coupled to a bus. The first state machine is configured to determine that a first output signal is a first symbol if a first received bus signal transitions from a first bus state to a second bus state and stays in the second bus state for less than a first predetermined period of time, and the first output signal is a second symbol if the first received bus signal transitions from the first bus state to the second bus state and stays in the second bus state for at least the first predetermined period of time.

The details of one or more embodiments of the invention are set forth in the accompanying drawings and the description below. Other features, objectives, and advantages of the invention will be apparent from the description and drawings, and from the claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicates variations of the same structure, material, or process step may follow a figure.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discusses are merely illustrative of specific ways to make and use the invention, and do not limit the scope of the invention.

The present invention will be described with respect to preferred embodiments in a specific context, namely a receiver architecture. The invention may also be applied, however, to other types of circuits, systems, and methods, such as systems in which two half rate data path signals are combined based upon a set of rules with certain control signals reacting at the full rate.

Figure 1:
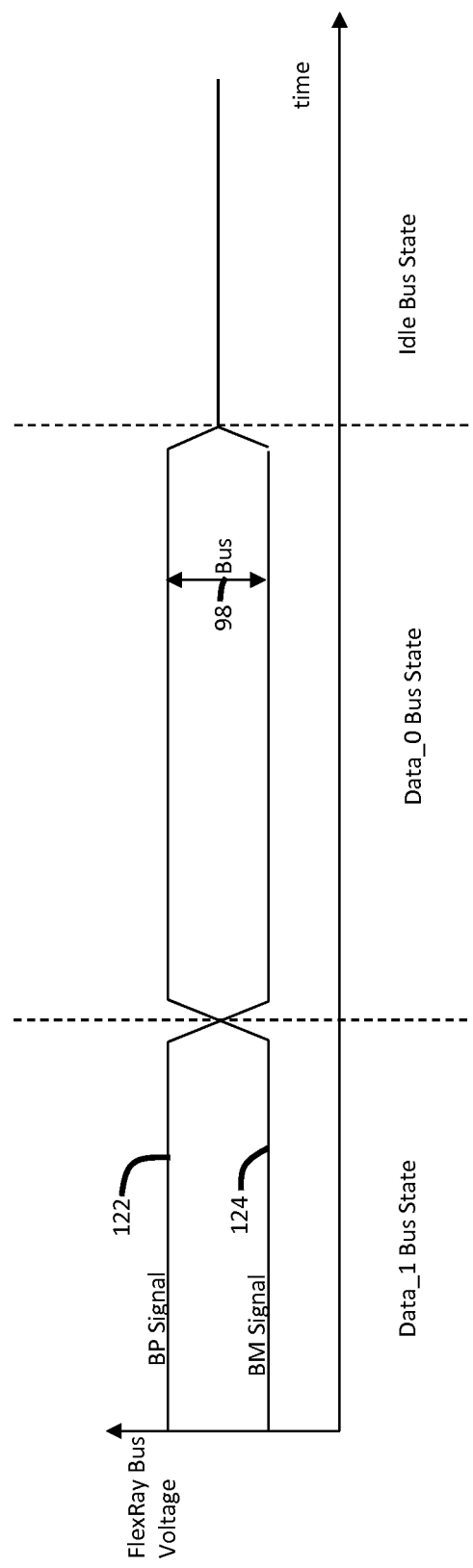
FIG. 1 illustrates signals in a FlexRay bus.

FIG. 1 illustrates signals in a FlexRay bus. The FlexRay protocol, which involves transmitting signals across a FlexRay bus, can be used to connect automotive electronic control units. Designed for time-triggered networks with data rates of up to 10 Mbit/s, the medium FlexRay uses dual wires, where a signal is represented by a differential voltage between the two wires. The FlexRay bus has three states: the Data_0 bus state, the Data_1 bus state, and the Idle bus state. As illustrated, the FlexRay bus wires are denoted by BP 122 and BM 124. Hence, the voltage difference between the bus wires, Bus 98, is equal to the voltage difference of BP 122 and BM 124. In the idle state, BP 122 and BM 124 are biased at approximately the same voltage level, so Bus 98 is approximately zero. However, in the Data_1 state, Bus 98 is positive, and in the Data_0 state Bus 98 is negative.

Figure 2:
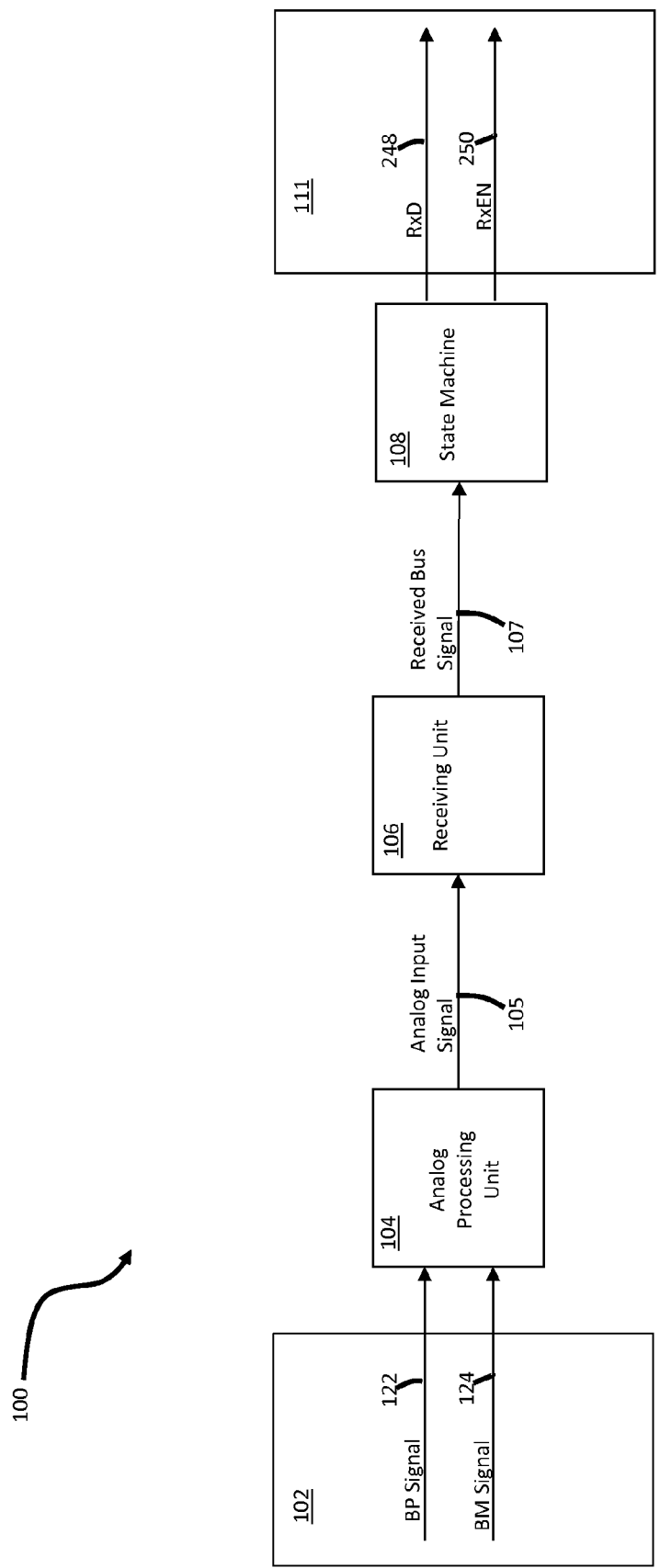
FIG. 2 illustrates an embodiment receiver.

FIG. 2 illustrates embodiment receiver 100, which is configured to convert a bus signal to an output signal. In an example, receiver 100 converts a FlexRay bus signal having BP 122 and BM 124 to a two bit digital signal having RxD signal 128 and RxEN signal 250. When the FlexRay bus is in the Idle state, RxD and RxEN are both high. Conversely, when the FlexRay bus is in the Data_0 state, RxD and RxEN are both low. However, when the FlexRay bus is in the Data_1 state, RxD is high and RxEN is low. Receiver 100 may be coupled to a bus (not pictured), which provides bus input signal 102 to receiver 100. In some embodiments, bus input signal 102 may be an analog differential input signal or a single ended signal, that is transmitted by a twisted wire pair, a single wire, a fiber optic cable, or a power-line communication. For example, bus input signal 102 may be an analog differential signal that may have a first bus state and a second bus state. In another example, bus input signal 102 may also have a third bus state corresponding to an idle state. In an embodiment, the first bus state corresponds to the Data_0 bus state, the second bus state corresponds to the Data_1 bus state, and the third bus state corresponds to the Idle bus state. While the Flexray standard defines three bus states, different systems may have other defined states, or multiple states that follow different transition rules.

Initially, analog processing unit 104 processes bus input signal 102 containing BP 122 and BM 124, to produce analog input signal 105. Analog processing unit 104 may contain a low pass filter and/or a common mode choke to block high frequency components of bus input signal 102. Also, analog processing unit 104 may include a resistive differential input divider where the symmetry point is clamped to a regulated common mode reference voltage to convert the voltage level of the bus, which may be from about −40 V to about 40 V, to a lower voltage level to enable the usage of lower voltage devices. Alternately, analog processing unit 104 may directly pass through bus input signal 102. Next, receiving unit 106 converts analog input signal 105 to received bus signal 107. For example, receiving unit 106 may convert a three state analog differential signal, such as a FlexRay bus signal, to a two bit digital signal. In one embodiment, received bus signal 107 is a digital signal containing two parallel bits. In other examples, received bus signal 107 contains two serial bits, or one digital bit.

Finally, state machine 108 is applied to received bus signal 107 to yield output signal 111. In an embodiment, output signal 111 is a two bit digital signal, for example a signal containing RxD signal 248 and RxEN signal 250. In an example, state machine 108 may determine that a change in the bus state of received bus signal 107 that lasts for less than a predetermined period of time does not cause output signal 111 to change its value. However, when received bus signal 107 changes bus states and remains in the transmitted to bus state for more than the predetermined period of time, state machine 108 causes output signal 111 to change its value. Hence, the analog circuit converts the bus levels into binary signals, and the digital circuit interprets the stream of binary signals based on a set of rules and generates control signals, such as RxD signal 248 and RxEN signal 250.

Figure 3:
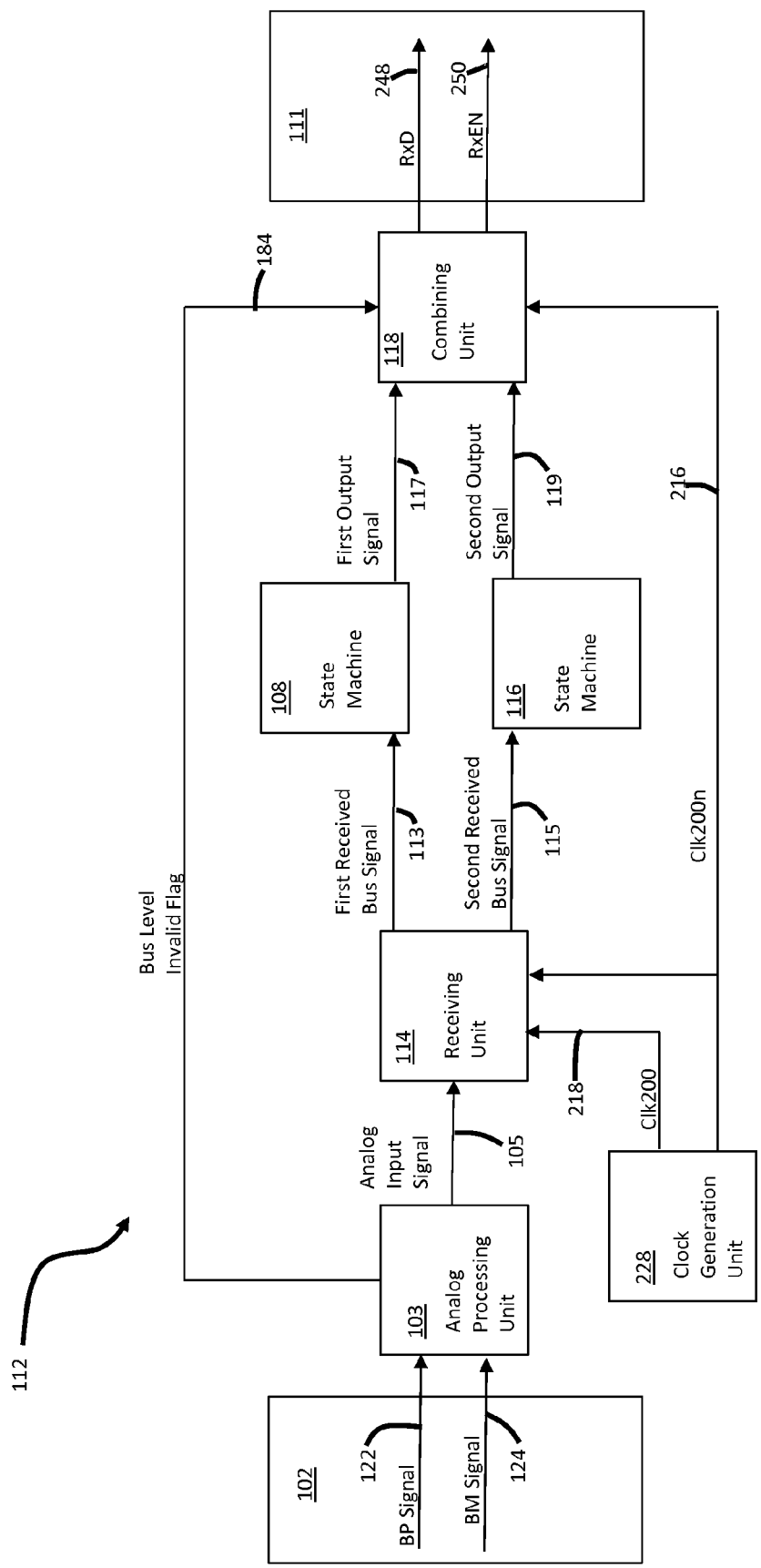
FIG. 3 illustrates another embodiment receiver.

FIG. 3 illustrates embodiment receiver 112 that is configured to convert a bus input signal to two digital signals, apply a separate state machine to each of these two digital signals, and combine the outputs of the two state machines to yield an output signal. Receiver 112 contains analog processing unit 103 which, like analog processing unit 104 in receiver 100, processes bus input signal 102 to produce analog input signal 105. However, analog processing unit 103 may also output bus level invalid flag 184, which indicates that the bus is corrupted. Thus, voltage and current levels are analyzed by independent measurement units and subjected to certain plausibility checks.

Also, clock generation unit 228 outputs two clock signals, Clk200 signal 216 and Clk200n signal 218. In an embodiment, Clk200n signal 218 has the opposite polarity of Clk200 signal 216. In an example, Clk signal 216 and Clk200n signal 218 have a clock rate of 250 MHz. By using two out of phase clock signals having clock rates of 250 MHz each, an effective sampling rate of 500 MHz may be achieved without clock generation unit 228 having to output a 500 MHz clock. Alternately, other clock rates may be used. Thus the clock rate in receiver 112 is half the clock rate of the data transmitted on the bus.

Next, receiving unit 114 converts analog input signal 105 to first received bus signal 113 and second received bus signal 115 using Clk200 signal 216 and Clk200n signal 218. If analog input signal 105 is a three state differential signal, receiving unit 114 may convert the differential signal to a two bit digital signal, where the where the two bit digital signal codes for three different bus states that the differential signal may be in. For example, the analog input may be a FlexRay bus signal and the digital output may be a two bit digital signal containing RxD and RxEN. Alternately, receiving unit 114 may convert a two state differential signal to a one bit digital signal. Additionally, receiving unit 114 converts analog input signal 105 to first received bus signal 113 and second received bus signal 115, which may each have a two bit digital signal. In an example, analog input signal 105 is sampled on the rising edge of Clk200 signal 216 to yield first received bus signal 113. Similarly, analog input signal 105 is sampled on the rising edge of Clk200n signal 218, which corresponds to the falling edge of Clk200 signal 216, to yield second received bus signal 115. Receiving unit 114 may contain latches to latch first received bus signal 113 and second received bus signal 115. Further, first received bus signal 113 and second received bus signal 115 may be filtered, for example using a shift register average value.

After receiving unit 114, first received bus signal 113 is applied to state machine 108 to yield first output signal 117, while second received bus signal 115 is applied to state machine 116 to yield second output signal 119. In an embodiment, state machine 116 is the same as state machine 108. Alternately, state machine 116 may be different than state machine 108. For example, one state machine may be dominant. There may be transition situations, for example due to disturbances, where one state machine has the lead. The status of both state machines are considered, but for certain diverging states or transitions, one state machine is dominant. For example, the lock mechanism may be covered in such an approach.

Finally, combining unit 118 merges first output signal 117 and second output signal 119 to yield bus state output signal 111, which may contain RxD signal 248 and RxEN signal 250. Besides merging first output signal 117 and second output signal 119, combining unit 118 may lock bus stage output signal 111.

Figure 4:
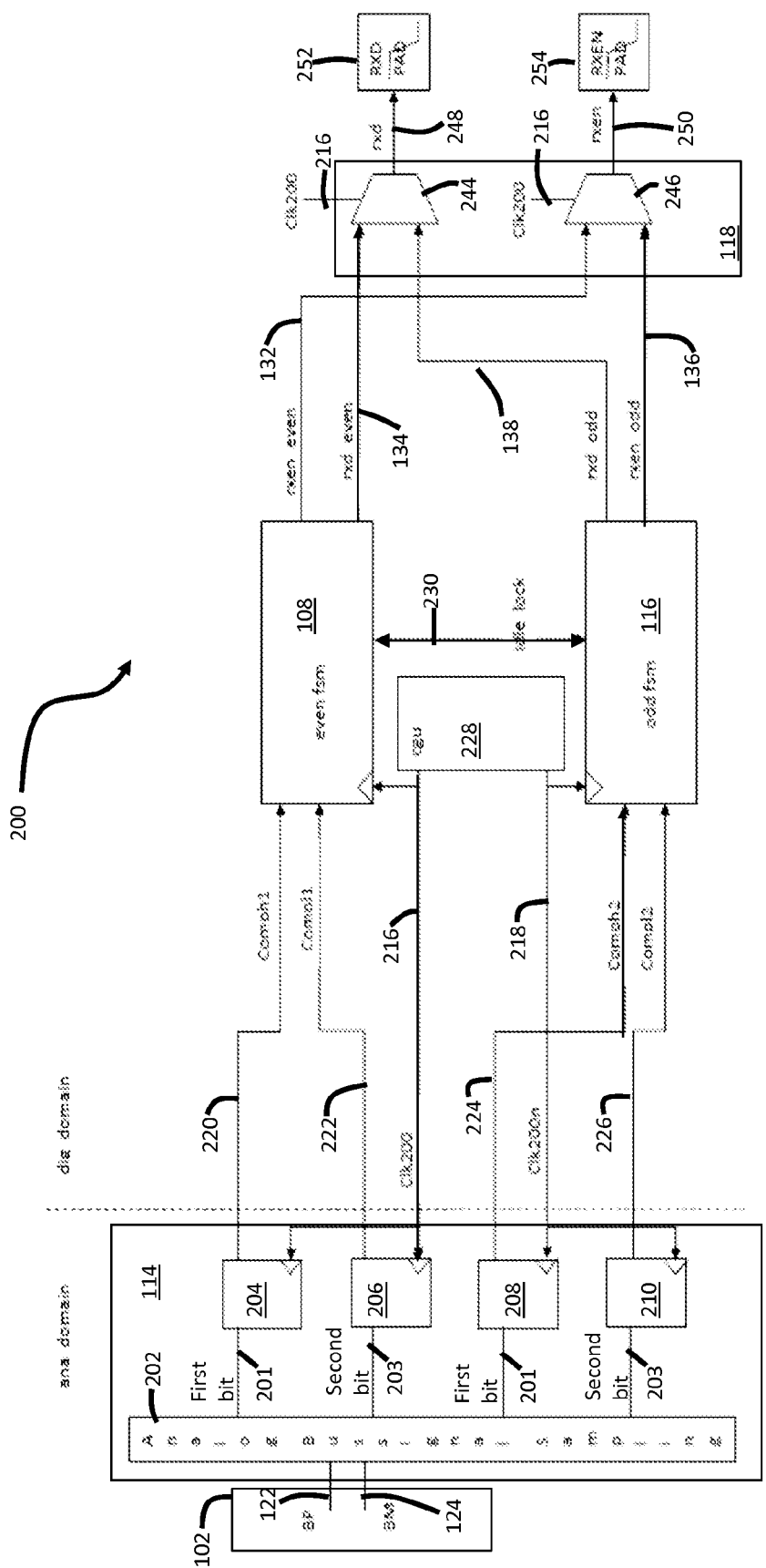
FIG. 4 illustrates another embodiment receiver.

FIG. 4 illustrates embodiment receiver 200 that is configured to convert a FlexRay bus signal to two digital signals, apply a separate state machine to each of these two digital signals, and combine the outputs of the two state machines to yield an output signal which may contain an RxD signal and an RxEN signal. For receiver 200, bus input signal 102 contains BP 122 and BM 124, which are FlexRay bus input signals. Receiving unit 114 contains analog bus signal sampling unit 202 and latches 204, 206, 208, and 210. Initially, analog bus signal sampling unit 202 samples BP 122 and BM 124 to yield a two bit signal having first bit 201 and second bit 203. When the potential difference between BP 122 and BM 124 is high, for example greater than 300 mV, the bus is in the Data_1 state, and first bit 201 is low and second bit 203 is high. However, when the potential difference between BP 122 and BM 124 is low, for example less than −300 mV, the bus is in the Data_0 state, and first bit 201 and second bit 203 are both low. Conversely, when the potential difference between BP 122 and BM 124 is approximately zero, for example between −30 mV and 30 mV, the bus is in the Idle state, and both first bit 201 and second bit 203 are low.

As discussed above, clock generation unit 228 outputs Clk200 signal 216 and Clk200n signal 218, which are clock signals with the same frequency and opposite polarities. Then, latch 204 latches first bit 201 on the rising edge of Clk200 signal 216 to yield Comph1 signal 220, while latch 206 latches second bit 203 on the rising edge of Clk200n signal 218, which corresponds to the falling edge of Clk200 signal 216, to yield Compl1 signal 222. Similarly, latch 208 latches first bit 201 on the rising edge of Clk200 signal 216 to yield Comph2 signal 224 while latch 210 latches second bit 203 on the rising edge of Clk200n signal 218, which corresponds to the falling edge of Clk200 signal 216, to yield Compl2 signal 226. Comph1 signal 220 and Compl1 signal 222 are the inputs to state machine 108, while Comph2 signal 224 and Compl2 signal 226 are the inputs to state machine 116. Idle lock signal 230 is one or more bidirectional control signal that prevents diverging states in the two state machines in the case of a disturbance. Idle lock signal 230 may protect against disturbances where state machine states diverge. This protects against the two state machines diverging, so they are not synchronized, and both state machines would otherwise need to be reset to a common starting point. The outputs of state machine 108 are RxEN even signal 132 and RxD even signal 134, while the outputs of state machine 116 are RxEN odd signal 136 and RxD odd signal 138.

Next, combining unit 118 determines the state of the output bus based on the outputs of state machine 108 and state machine 116. Also, combining unit 118, which contains multiplexer 244 and multiplexer 246, merges RxD even signal 134 and RxD odd signal 138 to yield RxD signal 248 and merges RxEN even signal 132 and RxEN odd signal 136 to yield RxEN signal 250. Multiplexer 244 merges RxD even signal 134 and RxD odd signal 138 by assigning RxD signal 248 to RxD even signal 134 when Clk200 signal 216 is high and to RxD odd signal 138 when Clk200 signal 216 is low. Similarly, multiplexer 246 merges RxEN even signal 132 and RxEN odd signal 136 by assigning RxEN signal 250 to RxEN even signal 132 when Clk200 signal 216 is high and to RxEN odd signal 136 when Clk200 signal 216 is low. Finally, RxD signal 248 is output to RxD pad 252 while RxEN signal 250 is output to RxEN pad 254.

Figure 5:
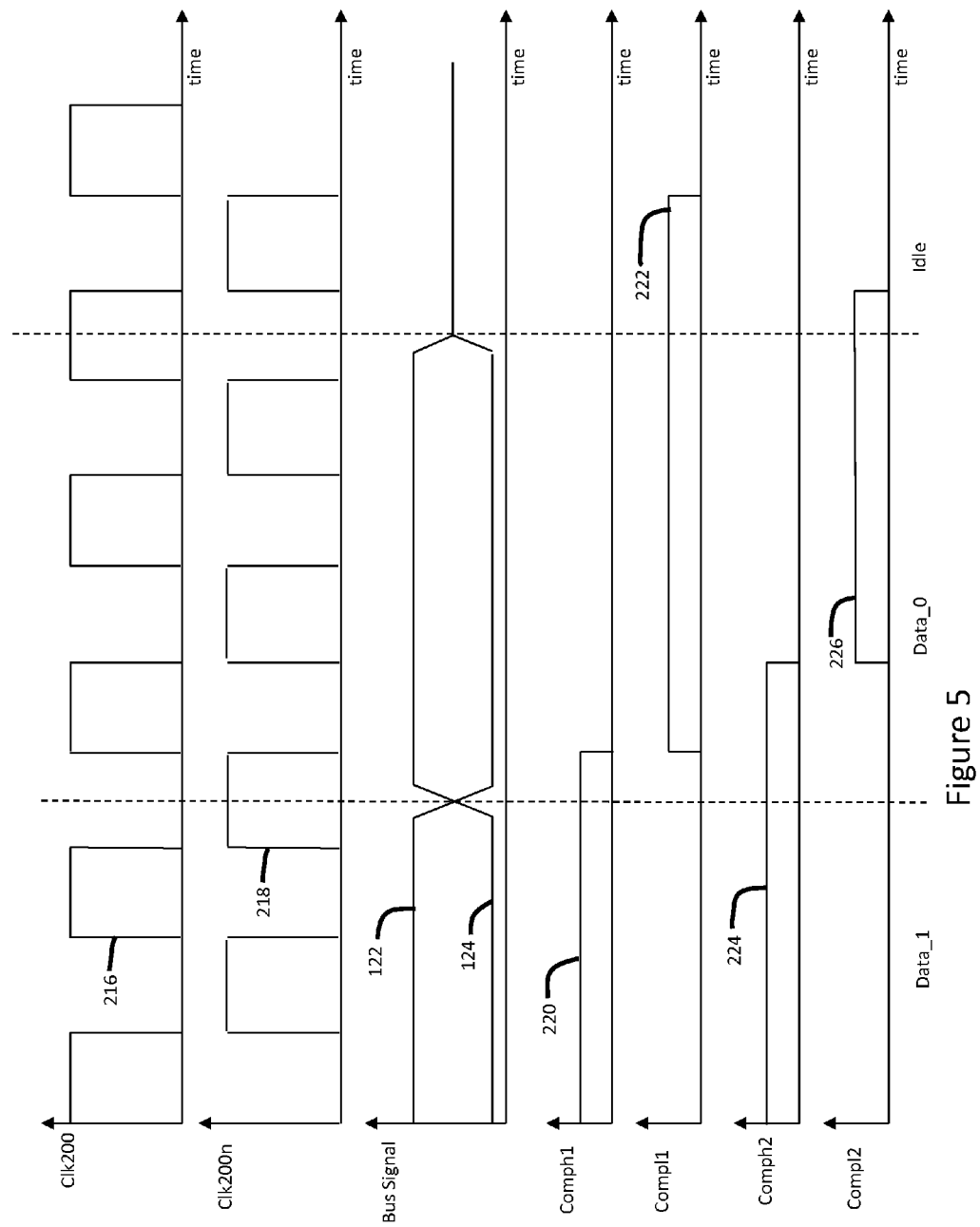
FIG. 5 illustrates signals in an embodiment receiver.

FIG. 5 illustrates waveforms of signals in an embodiment receiving unit. In an example, Clk200 signal 216 and Clk200n signal 218 both have a frequency of 250 MHz, and opposite polarities. Clk200 signal 216 and Clk200n signal 218 convert BP signal 212 and BM signal 214 to Comph1 signal 220, Compl1 signal 222, Comph2 signal 224, and Compl2 signal 226. When the voltage difference between BP 122 and BM 124 is high, the bus is in the Data_1 state. However, when the voltage difference between BP 122 and BM 124 is low, the bus is in the Data_0 state. Additionally, when the voltage difference between BP 122 and BM 124 has an intermediate value, the bus is in the Idle state. Alternatively, other bus levels may correspond to different states.

When the bus state is Data_1, Comph1 signal 220 and Comph2 signal 224 are high, while Compl1 signal 222 and Compl2 signal 226 are low. When the bus state is Data_0, Comph1 signal 220 and Comph2 signal 224 are low, while Compl1 signal 222 and Compl2 signal 226 are all high. However, when the bus state is Idle, Comph1 signal 220, Comph2 signal 224, Compl1 signal 222, and Compl2 signal 226 are all low. Comph1 signal 220 and Compl1 signal 224 are updated on the rising edge of Clk200 signal 216, while Comph2 signal 222 and Compl2 signal 226 are updated on the rising edge of Clk200n signal 218, which corresponds to the falling edge of Clk200 signal 216.

Figure 6A:
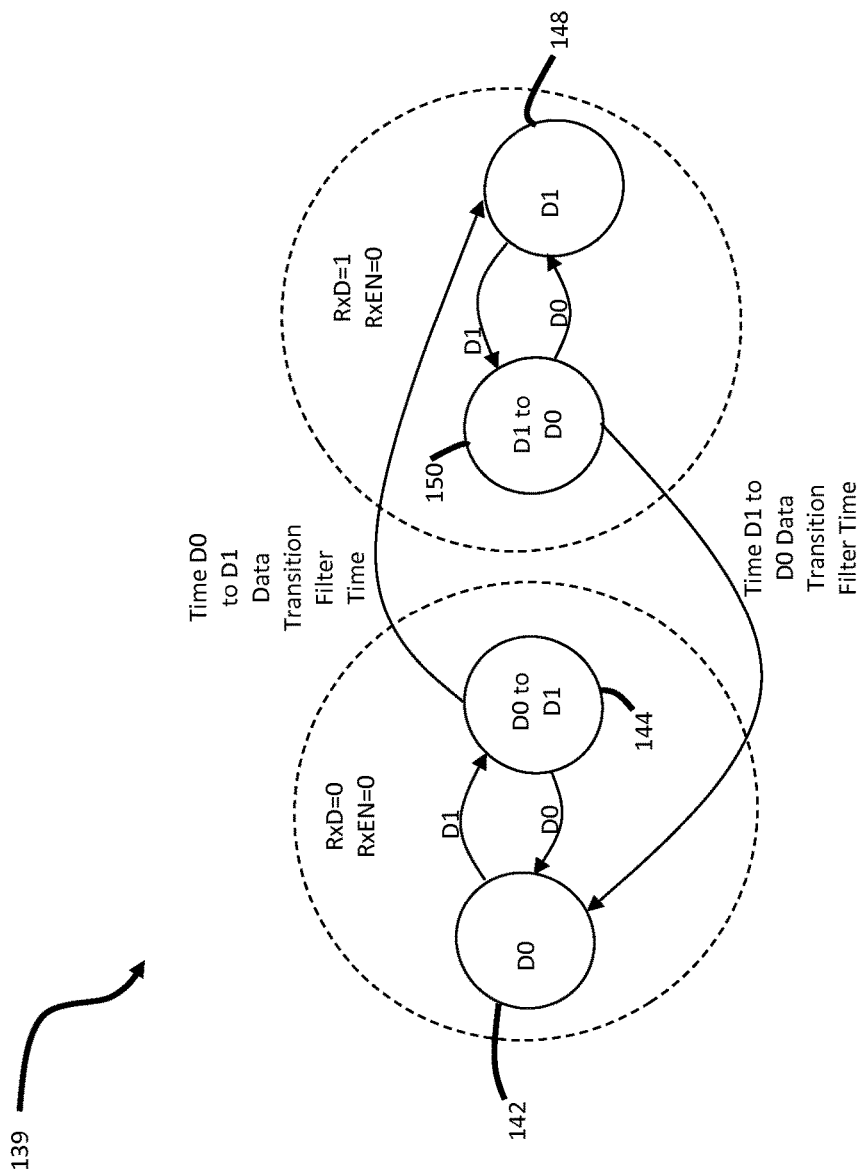
FIGS. 6*a-b* illustrate state machines used in embodiment receivers.
Figure 6B:
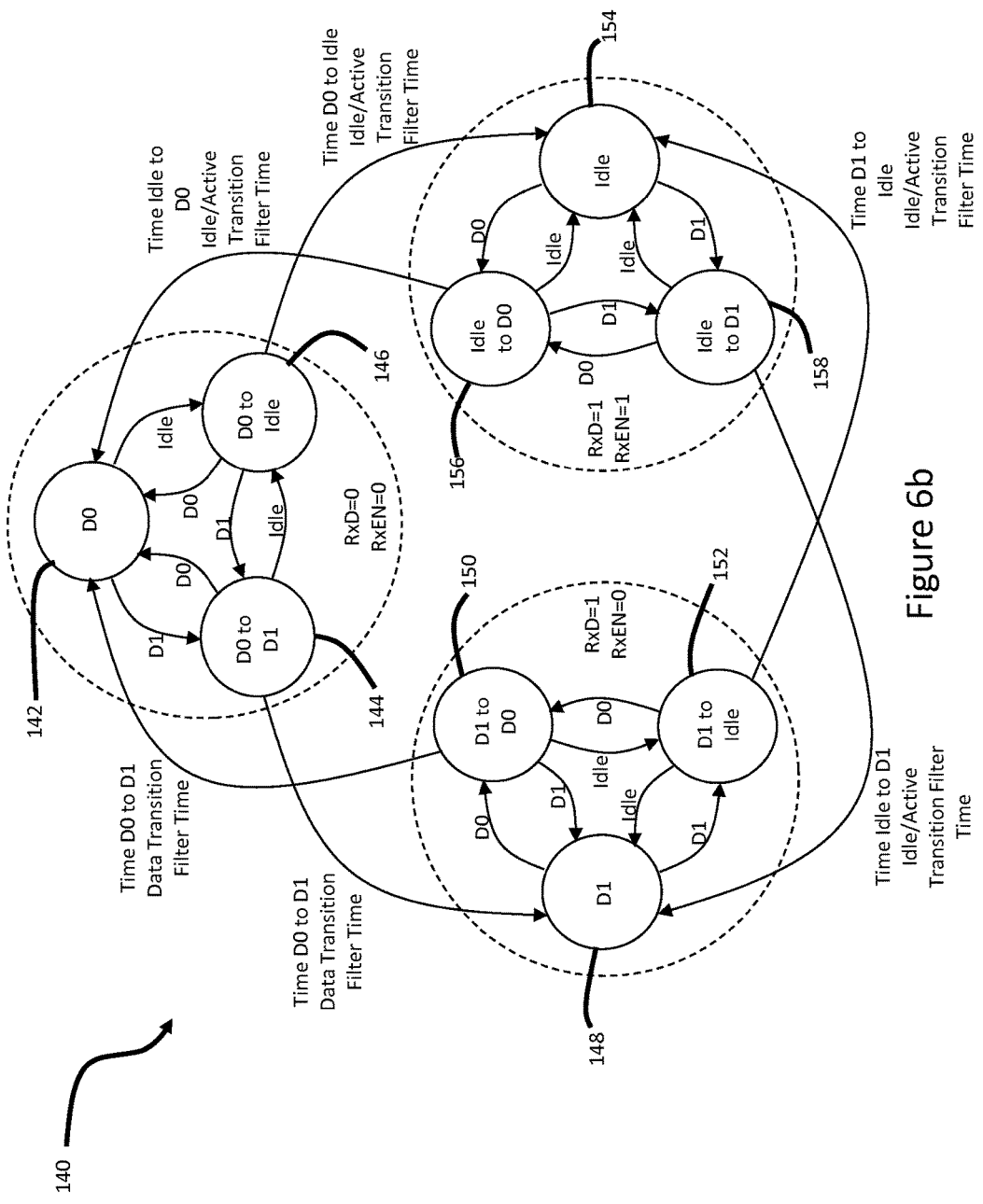

FIGS. 6a-b illustrate embodiment state machines, which transition the output value only when the input signal transitions states and remains in the transitioned to state for at least a predetermined period of time, for example for 10 ns. In an example, the input signal is a bus signal, for example a FlexRay bus signal. The state machines illustrated in FIGS. 6a-b may be examples of state machine 108 and/or state machine 116.

FIG. 6a illustrates state machine 139, which is coupled to an input signal having two states. State machine 139 has four states, D0 state 142, D0 to D1 state 144, D1 state 148, and D1 to D0 state 150. D0 to D1 state 144 and D1 to D0 state 150 are evaluation states, during which the system determines whether there is a real transition between input bus states, or only a short time disturbance due to noise. In an example, the input for state machine 139 is either the Data_1 bus state or the Data_0 bus state, while the output for state machine 139 may be two digital bits, for example RxD and RxEN. Alternately, the output may be a one bit digital signal. If the input signal to state machine 139 is in the Data_1 bus state for an extended period of time, state machine 139 is in the D1 state 148. Similarly, if the input signal to state machine 139 is in the Data_0 bus state for an extended period of time, state machine 139 is in the D0 state 142. Then, if state machine 139 is in the D0 state 142, and the input signal transitions to the Data_1 bus state, state machine 139 transitions to the D0 to D1 state 144. Next, if state machine 139 remains in the D0 to D1 state 144 for at least a first predetermined period of time, for example for 10 ns, state machine 139 transitions to the D1 state 148. However, if state machine 139 is in the D0 to D1 state and the input transitions to the Data_0 bus state, state machine 139 transitions to the D0 state 142.

If state machine 139 is in the D1 state 148, and the bus input transitions to the Data_0 bus state, state machine 139 transitions to the D1 to D0 state 150. Next, if state machine 139 is in the D1 to D0 state 150, and the input signal transitions to the Data_1 bus state, state machine 139 transitions to the D1 state 148. However, if state machine 139 is in the D1 to D0 state 150 for at least a second predetermined period of time, state machine 139 transitions to the D0 state 142. In an example, the second predetermined period of time is the same as the first predetermined period of time, for example 10 ns. In another example, the second predetermined period of time is greater than the first predetermined period of time, for example 100 ns. Alternately, other time periods may be used.

If state machine 139 is in the D0 state 142 or the D0 to D1 state 144, state machine 139 assigns both RxD and RxEN to a low value. However, if state machine 139 is in the D1 state 148 or the D1 to D0 state 150, state machine 139 assigns RxD to a high value and RxEN to a low value.

FIG. 6b illustrates state machine 140, which is configured to be coupled to a three state bus, such as a FlexRay bus. State machine 140 has nine states: the D0 state 142, the D0 to D1 state 144, the D0 to Idle state 146, the D1 state 148, the D1 to D0 state 150, the D1 to Idle state 152, the Idle state 154, the Idle to D0 state 156, and the Idle to D1 state 158. It should be appreciated, however, that in alternative embodiments, there may be greater or fewer states. State machine 140 is configured to determine a two bit digital output signal having three states based on an input bus signal that has three bus states. The input bus states are the Data_0 bus state, the Data_1 bus state, and the Idle bus state. The output signals are RxD=0 and RxEN=0, corresponding to a bus state of Data_0, RxD=1 and RxEN=0, corresponding to a bus state of Data_1, and RxD=1 and RxEN=1, corresponding to an Idle bus state. The transitions between the D0 state 142, the D0 to D1 state 144, the D1 state 148, and the D1 to D0 state 150 in state machine 140 are similar to those for state machine 139, discussed above. Additionally, if the input signal is in the Idle bus state for an extended period of time, state machine 140 will be in Idle state 154.

Also, if state machine 140 is in the D0 state 142 or the D0 to D1 state 144, and the input signal transitions to the Idle bus state, state machine 140 transitions to the D0 to Idle state 146. Then, if state machine 140 remains in the D0 to Idle state 146 for at least a third predetermined period of time, for example for 100 ns, state machine 140 transitions to the Idle state 154. However, if state machine 140 is in the D0 to Idle state 146, and the input signal transitions to the Data_0 bus state, the state machine transitions to the D0 state 142. Similarly, if state machine 140 is in the D0 to Idle state 146, and the input signal transitions to the Data_1 bus state, state machine 140 transitions to the D0 to D1 state 144.

If state machine 140 is in the D1 state 148 or the D1 to D0 state 150, and the input signal transitions to the Idle bus state, state machine 140 transitions to the D1 to Idle state 152. However, if state machine 140 is in the D1 to Idle state 152, and the input signal remains in the Idle bus state for at least a fourth predetermined period of time, for example for 100 ns, state machine 140 transitions to Idle state 154. Also, if state machine 140 is in the D1 to Idle state 152, and the input signal transitions to the Data_0 bus state, state machine 140 transitions to the D1 to D0 state 150. However, if state machine 140 is in the D1 to D0 state 150 or the D1 to Idle state 152, and the input signal transitions to the Data_1 bus state, the state machine transitions to the D1 state 148.

Similarly, if state machine 140 is in the Idle state 154 or the Idle to D1 state 158, and the input signal transitions to the Data_0 bus state, state machine 140 transitions to the Idle to D0 state 156. Also, if state machine 140 is in the Idle to D0 state 156, and the input signal remains in the Data_0 bus state for at least a fifth predetermined period of time, for example for 100 ns, state machine 140 transitions to the D0 state 142. However, if state machine 140 is in the Idle state 154 or the Idle to D0 state 156, and the input signal transitions to the Data_1 bus state, state machine 140 transitions to Idle to the D1 state 158. Then, if state machine 140 is in the Idle to D1 state 158 be for at least a sixth predetermined period of time, for example for 100 ns, state machine 140 transitions to D1 state 148. However, if state machine 140 is in the Idle to D0 state 156 or the Idle to D1 state 158, and the input signal transitions to the Idle bus state, state machine 140 transitions to the Idle state 154.

When state machine 140 is in the D0 state 142, the D0 to D1 state 144, or the D0 to Idle state 146, state machine 140 assigns the output signal to RxEN=RxD=0. However, when state machine 140 is in the D1 state 148, the D1 to D0 state 150, or the D1 to Idle state 152, state machine 140 assigns the output signal to RxD=1 and RxEN=0. Then, when state machine 140 is in the Idle state 154, the Idle to D0 state 156, or the Idle to D1 state 158, state machine 140 assigns the output is RxD=RxEN=1.

In one example, the first predetermined period of time is equal to the second predetermined period of time, and the third predetermined period of time, the fourth predetermined period of time, the fifth predetermined period of time, and the sixth predetermined period of time are all equal. However, the first and second predetermined periods of time are less than the third, fourth, fifth, and sixth predetermined periods of time. For example, the first and second predetermined periods of time may be 10 ns, while the third, fourth, fifth, and sixth predetermined periods of time are 100 ns. In another example, all six predetermined periods of time are equal. Alternately all predetermined periods of time may be different.

In additional embodiments, the state machine may be implemented using a greater number of states applied to an input signal that contains a greater number of bus states. For example, if the input data has four bus states, a 16-state state machine may be used to map the four-state input signal to a two bit four state digital output signal. In another example, there might be additional intermediate states, such as a D0 to D1 to Idle state, a D0 to Idle to D1 state, a D1 to D0 to Idle state, a D1 to Idle to D0 state, an Idle to D0 to D1 state, and an Idle to D1 to D0 state.

State machine 140 may be implemented using low power 130 nm technology based on power DMOS and/or CMOS transistors, possibly designed using digital verification methods such as static timing analysis. In an example, fully synchronous synthesized logic from a hardware descriptive language (HDL), such as very high speed integrated circuit (VHSIC) hardware descriptive language (VHDL) or Verilog is developed.

Figure 7A:
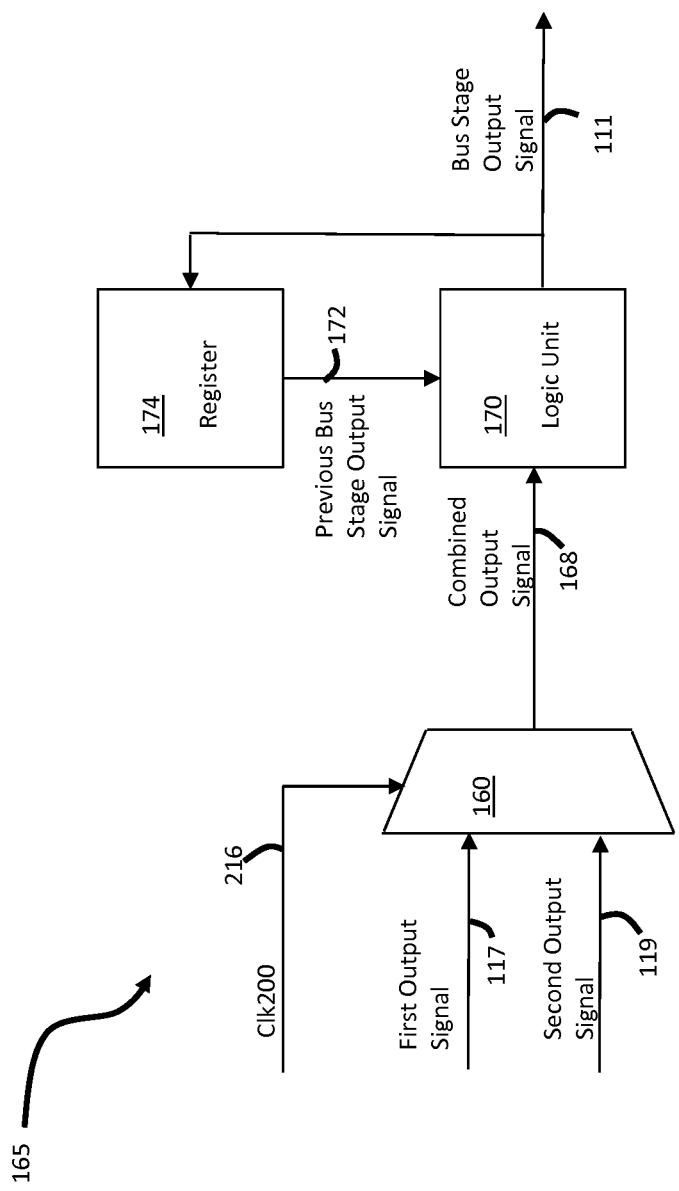
FIGS. 7*a-d* illustrate combining units used in embodiment receivers.

FIGS. 7a-d illustrate combining units that may be used to lock and merge the outputs of two state machines to generate a bus stage output signal. FIG. 7a illustrates combining unit 165, in which multiplexer 160 selects first output signal 117 when Clk200 signal 216 is high and selects second output signal 119 when Clk200 signal 216 is low. Thus, multiplexer 160 merges first output signal 117 and second output signal 119 to yield combined output signal 168. Next, logic unit 170 determines bus state output signal 111 based on combined output signal 168 and previous bus stage output signal 172. If previous bus state output signal 172 does not equal combined output signal 168, logic unit 170 assigns bus stage output signal 111 the value of previous bus state output signal 172 instead of combined output signal 168. Next, register 174 saves the value of bus state output signal 111. The register values are compared combinatorically with successor signals, and a lock change of bus stage output signal 111 is performed if the comparison rules are not fulfilled.

Figure 7B:
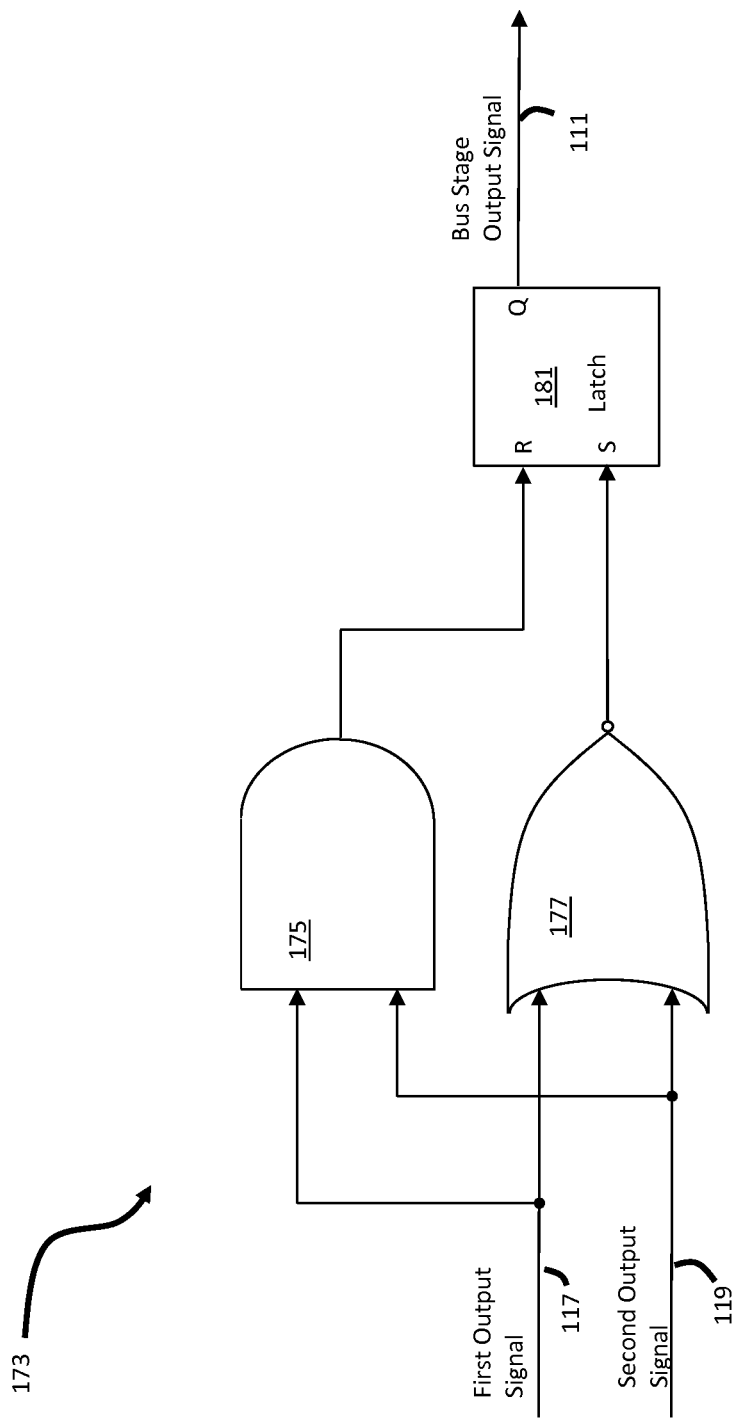

FIG. 7b illustrates combining unit 173. Initially, first output signal 117 and second output signal 119 are the inputs to AND gate 175, the output of which is coupled to the reset input for latch 181. Also, first output signal 117 and second output signal 119 are the inputs for NOR gate 177, the output of which is coupled to the set input for latch 181. Finally, the Q output of latch 181 outputs bus stage output signal 111.

Figure 7C:
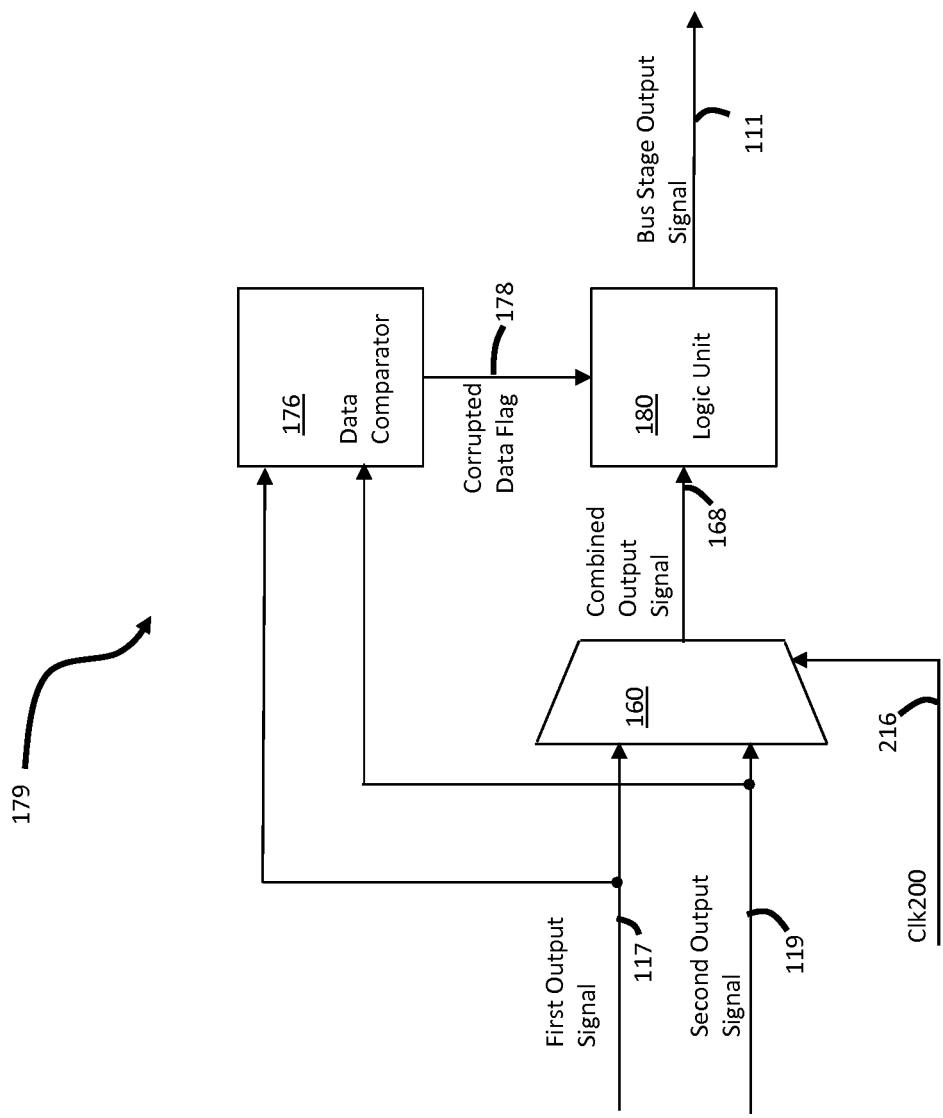

FIG. 7c illustrates combining unit 179, which contains multiplexer 160, discussed above, data comparator 176, and logic unit 180. Data comparator 176 compares first output signal 117 and second output signal 119 for two or three half cycles. If first output signal 117 and second output signal 119 are not the same over the two or three half cycles, data comparator 176 indicates so in corrupted data flag 178. If corrupted data flag 178 is raised, logic unit 180 sets bus stage output signal 111 to be two high values, indicating an error. In another example, the system may lock to a predecessor value or go to a certain level, such as two high bits, to indicate an error.

Figure 7D:
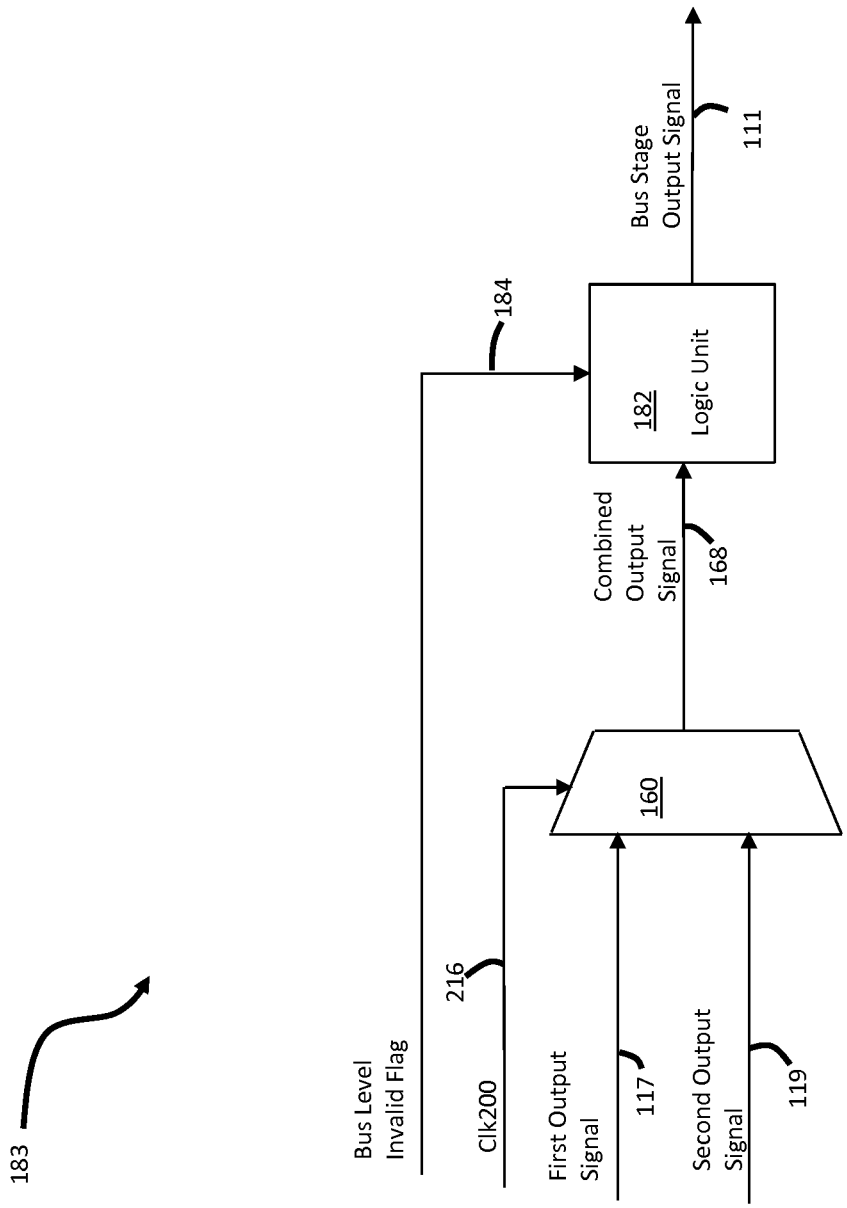

FIG. 7d illustrates combining unit 183, which contains multiplexer 160, discussed above, and logic unit 182. Combining unit 183 has an input of bus level invalid flag 184, which indicates that the bus input signal 102 is corrupted. Logic unit 182 assigns bus state output signal 111 to combined output signal 168 if the bus level invalid flag 184 is not raised, and outputs a previous value of combined output signal 168 if bus level invalid flag is raised. The analog lock signal locks the bus state output signal 111 to the predecessor value or forces bus state output signal 111 to a certain level, such as two high bits, to indicate an error.

Figure 8:
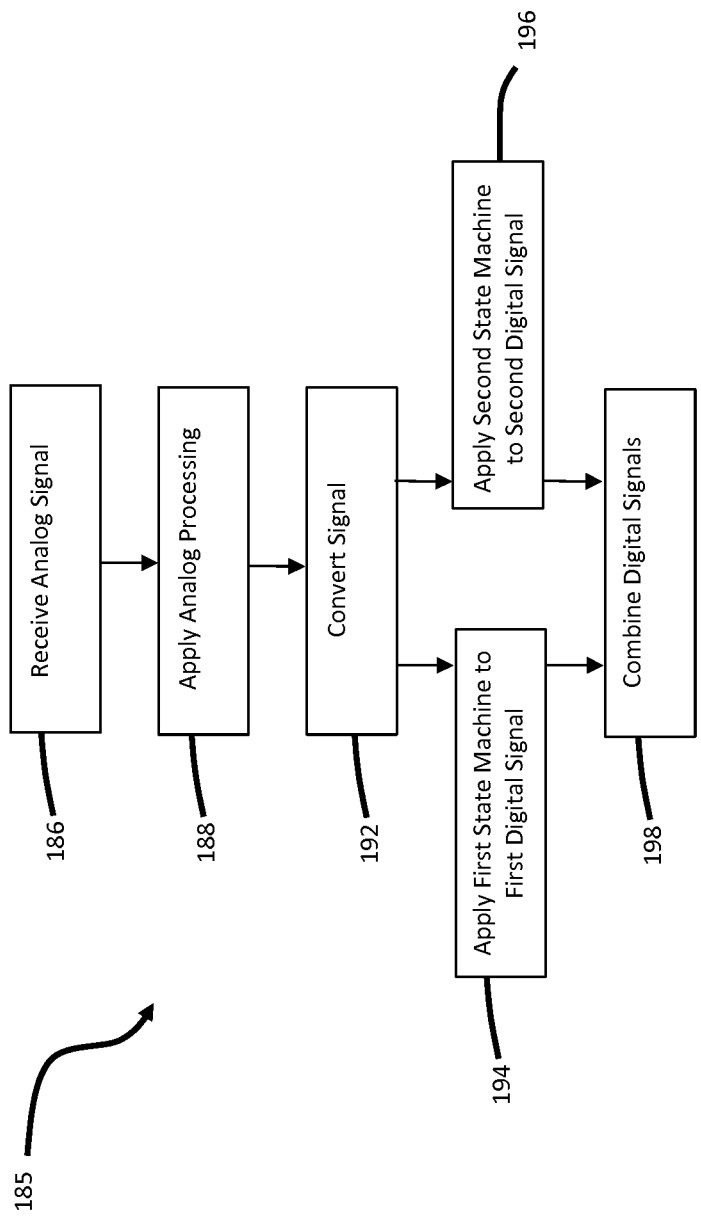
FIG. 8 illustrates the flowchart for an embodiment method for receiving a signal.

FIG. 8 illustrates a flowchart of method 185 for an embodiment receiver, which is configured to convert a bus signal to an output signal. Initially, in step 186, the receiver receives an analog signal from a bus. The received signal may be a FlexRay bus input signal having three bus states, a Data_0 state, a Data_1 state, and an Idle state, although it may be a single ended signal. Next, in step 188, analog processing is applied to the received analog signal. Step 188 may include applying an analog low pass filter to the received analog signal, determining if the bus signal is corrupted, or other analog processing. Alternately, no analog processing may be performed on the received signal.

Then, in step 192, the received analog signal is converted to two digital signals, which may each be a two bit digital signal. Re-clocking may be performed by sampling the received analog signal on the rising edge of the clock signal to obtain the first signal and sampling the received analog signal on the falling edge of the same clock signal to get a second signal, which may be performed using two clocks which have opposite polarities and with latches. For example, if the analog signal is a FlexRay bus signal having three states, a Data_0 state, a Data_1 state, and an Idle state, step 192 may convert the differential signal to a two bit digital signal.

Next, a first state machine is applied to the first digital signal in step 194, and a second state machine is applied to the second digital signal in step 196. In one example, step 194 and step 196 are performed simultaneously using separate digital logic. In an embodiment, the two state machines may be identical. Alternately, the two state machines might be different. The state machines may be configured to transition the output state only if the input signal transitions bus state and remains in the transitioned to state for at least a predetermined period of time. The predetermined period of time may be a function of the transitioned from state and the state the transitioned to state. The state machine concept underlies a set of rules that determine if a transition is due to a disturbance or is a real transition.

Finally, in step 198, the outputs of the two state machines are combined to yield an output signal. Additionally, in step 198, the output signals may be locked. The combining may be performed using a multiplexer where the selector is a clock signal. The locking may be performed using registers, latches, a flag from the bus, a flag from a two or three half clock comparator, or by another method.

Advantages of embodiments include the ability to reduce high frequency noise by applying a state machine to a bus signal. Also, embodiments may merge two data streams using multiplexers to avoid glitches. Additional advantages include the ability to receive high frequency data using a clock having a frequency half of that of the received data, reducing power and enabling for the use of lower speed components. Further, shifting functionality to the digital domain from the analog domain increases functional robustness due to semi-custom methods, and a modular digital architecture allows for substitution of building blocks. Additionally, locking the output signal reduces glitches. Furthermore, embodiments may comply with the FlexRay protocol.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A receiver comprising:
   an analog processing circuit configured to receive a first received bus signal, wherein the first received bus signal is an analog differential signal; and
   a first state machine coupled to the analog processing circuit, wherein the first state machine is configured to determine that a first output signal is:
   a first symbol if the first received bus signal transitions from a first bus state to a second bus state and stays in the second bus state for less than a first predetermined period of time;
   the first symbol if the first received bus signal remains in the first bus state for at least the first predetermined period of time; and
   a second symbol if the first received bus signal transitions from the first bus state to the second bus state and stays in the second bus state for at least the first predetermined period of time.

2. The receiver of claim 1, wherein the first state machine is further configured to determine that the first output signal is:
   the second symbol if the first received bus signal transitions from the second bus state to the first bus state and stays in the first bus state for less than a second predetermined period of time; and
   the first symbol if the first received bus signal transitions from the second bus state to the first bus state and stays in the first bus state for at least the second predetermined period of time.

3. The receiver of claim 2, wherein the first predetermined period of time is the same as the second predetermined period of time.

4. The receiver of claim 2, wherein the first state machine is further configured to determine that the first output signal is a third symbol if the first received bus signal transitions from the first bus state or the second bus state to a third bus state and stays in the third bus state for at least a third predetermined period of time.

5. The receiver of claim 4, wherein the first predetermined period of time is less than the third predetermined period of time.

6. The receiver of claim 4, wherein:
   the first bus state corresponds to a first data value;
   the second bus state corresponds to a second data value; and
   the third bus state corresponds to an idle state.

7. The receiver of claim 1, further comprising a second state machine configured to determine that a second output signal is:
   the first symbol if a second received bus signal transitions from the first bus state to the second bus state and stays in the second bus state for less than the first predetermined period of time; and
   the second symbol if the second received bus signal transitions from the first bus state to the second bus state and stays in the second bus state for at least the first predetermined period of time.

8. The receiver of claim 7, further comprising a combining unit configured to determine a bus state output signal based on the first output signal and the second output signal.

9. A method comprising:
receiving, by an analog processing circuit, a first bus signal, wherein the first bus signal is an analog differential signal; and
determining, by a state machine, a first output signal, comprising:
  determining that the first output signal is a first symbol if the first received bus signal transitions from a first bus state to a second bus state and stays in the second bus state for less than a first predetermined period of time,
  determining that the first output signal is the first symbol if the first received bus signal remains in the first bus state for at least the first predetermined period of time, and
  determining that the first output signal is a second symbol if the first received bus signal transitions from the first bus state to the second bus state and stays in the second bus state for at least the first predetermined period of time.

10. The method of claim 9, wherein determining a first output signal further comprises:
  determining that the first output signal is the second symbol if the first received bus signal transitions from the second bus state to the first bus state and stays in the first bus state for less than a second predetermined period of time; and
  determining that the first output signal is the first symbol if the first received bus signal transitions from the second bus state to the first bus state and stays in the first bus state for at least the second predetermined period of time.

11. The method of claim 10, wherein the first predetermined period of time is the same as the second predetermined period of time.

12. The method of claim 10, wherein determining a first output signal further comprises:
  determining that the first output signal is the first symbol if the first received bus signal transitions from the first bus state to a third bus state and stays in the third bus state for less than a third predetermined period of time; and
  determining that the first output signal is a third symbol if the first received bus signal transitions from the first bus state to the third bus state and stays in the third bus state for at least the third predetermined period of time.

13. The method of claim 12, wherein the first predetermined period of time is less than the third predetermined period of time.

14. The method of claim 12, wherein:
the first bus state corresponds to a first data value;
the second bus state corresponds to a second data value; and
the third bus state corresponds to an idle state.

15. The method of claim 12, wherein determining a first output signal further comprises:
  determining that the first output signal is the first symbol if the first received bus signal transitions from the third bus state to the first bus state and stays in the first bus state for at least a fourth predetermined period of time;
  determining that the first output signal is the third symbol if the first received bus signal transitions from the second bus state to the third bus state and stays in the third bus state for at least a fifth predetermined period of time; and
  determining that the first output signal is the second symbol if the first received bus signal transitions from the third bus state to the second bus state and stays in the second bus state for at least a sixth predetermined period of time.

16. The method of claim 15, wherein:
the third predetermined period of time is equal to the fourth predetermined period of time, the fifth predetermined period of time, and the sixth predetermined period of time;
the first predetermined period of time is equal to the second predetermined period of time; and
the third predetermined period of time is greater than the first predetermined period of time.

17. The method of claim 15, wherein determining an output signal further comprises:
  transitioning from a first state of a state machine to a second state of the state machine if the first received bus signal transitions from the first bus state to the second bus state;
  transitioning from the first state of the state machine to a third state of the state machine if the first received bus signal transitions from the first bus state to the third bus state;
  transitioning from the second state of the state machine to a fourth state of the state machine if the first received bus signal stays in the second bus state for more than the first predetermined period of time;
  transitioning from the third state of the state machine to a fifth state of the state machine if the first received bus signal stays in the third bus state for more than the third predetermined period of time;
  transitioning from the fourth state of the state machine to a sixth state of the state machine if the first received bus signal transitions from the second bus state to the first bus state;
  transitioning from the fourth state of the state machine to a seventh state of the state machine if the first received bus signal transitions from the second bus state to the third bus state;
  transitioning from the fifth state of the state machine to an eighth state of the state machine if the first received bus signal transitions from the third bus state to the first bus state;
  transitioning from the fifth state of the state machine to a ninth state of the state machine if the first received bus signal transitions from the third bus state to the second bus state;
  transitioning from the sixth state of the state machine to the first state of the state machine if the first received bus signal stays in the first bus state for more than the second predetermined period of time;
  transitioning from the seventh state of the state machine to the fifth state of the state machine if the first received bus signal stays in the third bus state for more than the fifth predetermined period of time;
  transitioning from the eight state of the state machine to the first state of the state machine if the first received bus signal stays in the first bus state for more than the fourth predetermined period of time; and
  transitioning from the ninth state of the state machine to the fourth state of the state machine if the first received bus signal stays in the second bus state for more than the sixth predetermined period of time.

18. The method of claim 17, wherein determining an output signal further comprises:
  determining that the first output signal is the first symbol if the state machine is in the first state, the second state, or the third state;

determining that the first output signal is the second symbol if the state machine is in the fourth state, the sixth state, or the seventh state; and determining that the first output signal is the third symbol if the state machine is in the fifth state, the eighth state, or the ninth state.

19. The method of claim 9, further comprising:

receiving a second bus signal; and determining a second output signal, comprising:
- determining that the second output signal is the first symbol if the second received bus signal transitions from the first bus state to the second bus state and stays in the second bus state for less than the first predetermined period of time, and
- determining that the second output signal is the second symbol if the second received bus signal transitions from the first bus state to the second bus state and stays in the second bus state for at least the first predetermined period of time.

20. The method of claim 19, further comprising determining a bus state output signal based on the first output signal and the second output signal.

21. The receiver of claim 1, further comprising:

a receiving unit configured to determine the first received bus signal and a second received bus signal based on a bus input signal; and a second state machine configured to determine that a second output signal is:
- the first symbol when the second received bus signal transitions from the first bus state to the second bus state and stays in the second bus state for less than a second predetermined period of time, and
- the second symbol when the second received bus signal transitions from the first bus state to the second bus state and stays in the second bus state for at least the second predetermined period of time.

22. The receiver of claim 21, wherein the first predetermined period of time is the same as the second predetermined period of time.

23. The receiver of claim 21, wherein the receiving unit comprises:

a first sampling unit configured to determine the first received bus signal by sampling the bus input signal with a first clock having a frequency and a phase; and a second sampling unit configured to determine the second received bus signal by sampling the bus input signal with a second clock having a frequency and a phase, wherein the frequency of the first clock is equal to the frequency of the second clock, and wherein the phase of the first clock does not equal the phase of the second clock.

24. The receiver of claim 23, wherein the first clock is based on a rising edge of a third clock and the second clock is based on a falling edge of the third clock.

25. The receiver of claim 21, further comprising a combining unit configured to determine a combined output signal by combining the first output signal and the second output signal.

26. The receiver of claim 25, wherein the combining unit is further configured to:

record the combined output signal; and determine a bus output signal by comparing the combined output signal to a previously recorded combined output signal, wherein the bus output signal is assigned to the previously recorded combined output signal when the previously recorded combined output signal does not equal the combined output signal.

27. The receiver of claim 25, wherein the combining unit is further configured to:

determine a compared output signal comprising comparing the first output signal and the second output signal; and latch the compared output signal.

28. The receiver of claim 25, wherein the combining unit is further configured to:

compare the first output signal to the second output signal; and assign the combined output signal to an idle state when the first output signal does not equal the second output signal.

29. The receiver of claim 25, wherein the combining unit comprises a multiplexer.

* * * * *